June 2, 1970  A. L. GARNERO  3,515,624
STRUCTURAL MATERIAL OF EXPANDED MINERALS
AND METHOD FOR MANUFACTURE
Original Filed Feb. 12, 1958
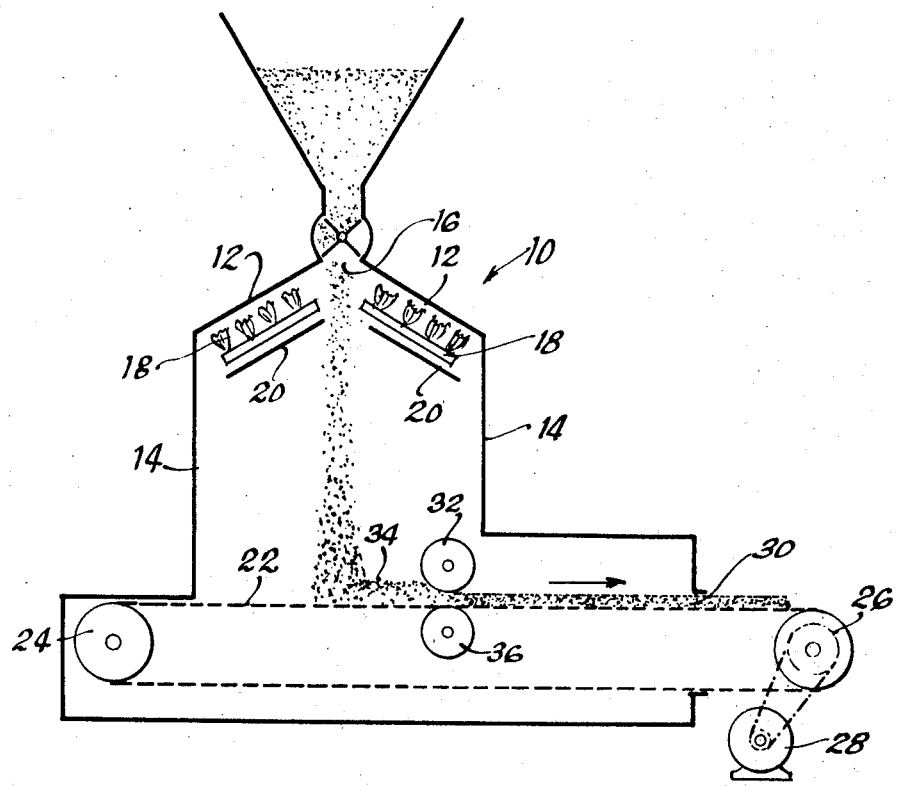
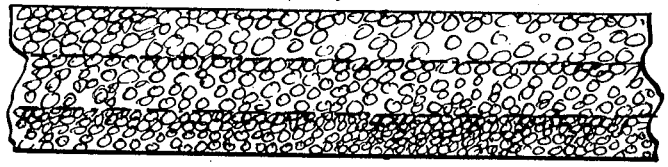
INVENTOR
BY Anthony L. Garnero
Attorneys

United States Patent Office 3,515,624
Patented June 2, 1970

3,515,624
STRUCTURAL MATERIAL OF EXPANDED MINERALS AND METHOD FOR MANUFACTURE
Anthony L. Garnero, Wheaton, Ill., assignor, by mesne assignments, to Central Manufacturing District, Chicago, Ill., a trust of Massachusetts
Continuation of application Ser. No. 714,831, Feb. 12, 1958. This application July 8, 1964, Ser. No. 381,145
Int. Cl. B32b 19/00
U.S. Cl. 161—159       2 Claims This invention relates to an insulation product and to a method for the manufacture of same. It relates particularly to the manufacture of an inorganic, highly porous, thermal insulation product and tiles of relatively high strength and good dimensional stability.

This is a continuation of my copending application Ser. No. 714,831, filed Feb. 12, 1958, entitled "Structural Material of Expanded Minerals and Method for Manufacturing" and now abandoned.

It is an object of this invention to produce and to provide a method for producing a thermal insulation product of inorganic materials thereby to provide for thermal and dimensional stability in the product that is formed. More particularly, it is an object of this invention to produce and to provide a method for producing a thermal insulation product formed of expanded perlite and it is a related object to form the insulation as an incidence to the expansion by thermal reaction of the perlite.

These and other objects and advantages of this invention will hereinafter appear and for purposes of illustration, but not of limitation, an embodiment of the invention is shown in the accompanying drawing in which—

FIG. 1 is a schematic diagram of a furnace which may be employed in the practice of this invention;

FIG. 2 is a cross-sectional view of a modification in a porous structure capable of being formed by this invention.

The invention will hereinafter be described with reference to the manufacture of the insulation products and tiles of expanded perlite.

Insulation products have heretofore been fabricated of expanded perlite, exfoliated vermiculite or bloated clay but, to the best of applicant's knowledge, such insulation products have been manufactured of perlite, clay or vermiculite which has been expanded separate and apart from the manufacture of the composite insulation structure. The expanded mineral has been used either in the particulate form for flow to fill the space to be insulated or else use has been made of the combination of the expanded mineral with a binder to form the molded or bonded, porous, composite insulation product.

To the present, perlite and the like minerals have been expanded by the passage of the perlite in finely divided form through a furnace which is maintained at elevated temperature. The intent of the expansion of perlite has been to produce separated particles which could be used as a filler for the insulation. Thus it was desirable to minimize contact between the particles of perlite during passage through the furnace to avoid clinker formation. Any agglomeration to form clinkers has been looked upon as undesirable in the expansion process and such clinkers as were formed have been discarded as waste material. The objective has been to minimize clinker formation since the formation of clinkers constitutes waste of material and clinker formation interfered with the expansion process since it necessitated interruption of the expansion process to enable the removal from the path of the particles being charged through the furnace.

In accordance with the practice of this invention, the expansion of perlite is carried out under conditions whereby agglomeration of the perlite is achieved coincident with the expansion of the perlite with the intention of producing a composite structure having good thermal insulation characteristics and strength properties sufficient to enable use of the composite as an insulation board, panel or the like structural material.

By the control of time and temperature for the expansion and agglomeration of the finely divided particles of perlite, it is possible to produce insulation products without further processing. It is preferred, however, to embody a compression step in combination with the expansion and agglomeration of the perlite particles to compact the expanded particles and to provide for a greater volume relationship therebetween thereby to enhance the strength of the composite products that are formed. By the combination which makes use of a compacting step or steps in conjunction with the expansion and agglomeration, it is possible to produce composite products having a density which may vary from 1 pound per cubic foot to as much as 80 pounds per cubic foot while still maintaining a porosity and a mass integrity sufficient to enable use thereof as a structural insulation material.

Referring now to perlite, it has been found that the desired expansion and agglomeration of the particles for the fabrication of a porous insulation, tile or panel structure can be achieved while the perlite particles are in a pyroplastic state, as distinguished from a fluid stage at above pyroplastic temperature or a non-deformable stage below the pyroplastic temperature. In this connection, it will be understood that the critical temperature conditions heretofore employed to define the limitations for the opertaion will vary somewhat with various types and grades of perlite. By way of illustration, using a common brand of perlite and by way of generalization, it appears that the perlite particles enter the pyroplastic stage and simultaneously are reacted to release combined water for expansion when heated to a temperature above 1400° F. although the rate of release of combined water or resistance to expansion is slow at temperatures in the range of about 1400° F. since only about a 60 percent expansion is achieved when the perlite particles are heated to this temperature for about 3 minutes. Some brands of perlite will enter the pyroplastic state for possible expansion at temperatures as low as 1200° F. Expansion at a maximum rate or to a maximum amount can be achieved when the particles of the perlite are heated to higher temperatures as within the range of 1600–2200° F. Within this temperature range, sufficient latitude exists with respect to time as to enable the processing of the expanded perlite particles in a manner to insure suitable agglomeration such as to provide for compacting the particles into a composite structure of a predetermined density. As much as 800 percent expansion can be achieved when the perlite particles are heated to a temperature of about 1600° F. for a time ranging from a few seconds to as much as 7 minutes or when heated to a temperature of 2200° F. for an even shorter time. Temperatures in excess of 2200° F. can be employed with corresponding reductions in time of exposure but it is undesirable to heat the particles to a temperature in excess of 2400–2500° F. for any length of time because the perlite is in such a fluid state at these temperatures as to lead to possible collapse of the expanded particles in the composite mass. When heated to 2400° F. or higher, the particles also tend to form into a glassy or a vitrified phase which reduces the porosity of the product and which also increases the brittleness thereof so as also to impair its insulation characteristics and strength. Thus, while the perlite can be heated in operation to a temperature in excess of 2500° F., the time factor becomes important because otherwise a reduction in volume will occur and an embrittled and weaker product will be secured. Within the temperature range of 1600–2400° F., best results are secured, from the standpoint of expansion, when the perlite particles are heated to a temperature of 1900–2200° F. since the adhesiveness developed seems to be at a maximum within this temperature range, as will hereinafter be pointed out.

Fusion believed to be necessary for adhesion occurs with the average perlite at a temperature within the range of 2000–2200° F. It has been found, however, that the combined water which is released as a vapor when the perlite particles are heated to a pyroplastic state operates as a flux which enables the desired stickiness to develop for agglomeration when the particles are heated to a temperature as low as 1400° F. but preferably at a temperature above 1600° F. Thus agglomeration can be achieved at a temperature starting at 1400° F. Best adhesions and expansions are secured when the particles are heated to a temperature above 1800° F. Thus the preferred conditions for operation from the standpoint of expansion and agglomeration will reside in heating the particles to a temperature of 1800–2200° F.

When the perlite particles are expanded separate and apart from agglomeration, the vapor necessary for fluxing the perlite is not available for subsequent agglomeration so that it becomes necessary to heat the expanded particles to a temperature in excess of about 2400° F. for coalescence. Since such temperatures are close to the temperature of collapse and since much greater time is required to agglomerate the previously expanded particles, it will be found difficult to form a composite structure of previously expanded perlite particles having the degree of porosity and strength which is capable of being achieved by the concepts embodying the features of this invention. It is for this reason that the art has had to turn to the use of external binders in combinations with the expanded perlite for the manufacture of porous products.

The time and temperature conditions employed for the practice of this invention may be summarized as including a minimum of 1400° F. and a maximum of 2500° F. for most of the common brands of perlite and a minimum of possibly 1200° F. for a few special brands. It is preferred to operate under the conditions which heat the perlite particles to a temperature within the range of 1600–2400° F. and best results will be secured when the perlite particles are heated to a temperature within the range of 1900–2200° F. within the tempertaure range of 1500–1700° F., longer time will be required to achieve a suitable degree of expansion and to develop adhesiveness sufficient for agglomeration. Above 2200° F. but below 2500° F., it is desirable to limit the heating of the particles to a time less than ½ minute for expansion and agglomeration. Between the temperatures of 1800° F. and 2200° F. and preferably between the temperatures of 1900° F. and 2200° F., considerable latitude exists with respect to the time that the particles are heated to the desired temperature for expansion and agglomeration. Within this range a fraction of a second to 5 minutes can be employed with a preferred time ranging from about 1–20 seconds depending upon the furnace design, the rate of feed, the size of the particles and the amount of combined water and perlite composition. It will be understood that the temperatures referred to are the temperatures for the perlite particles themselves and not the temperature of the flame or the temperature of the furnace in which the perlite particles are heated since the temperature of the flame and the temperature of the furnace may be a good deal higher.

The desired temperature conditions for heating the particles of perlite can be achieved in furnaces employing radiant heaters or direct heat. In the latter, the particles of perlite can be introduced directly into the flame for heating up during passage with the flame into and through the furnace or the particles may be introduced separate and apart from the flame, as in the radiant heating furnace, for travel through the heated space for a time sufficient to raise the temperature of the particles to within the range described.

The size of the particles of perlite is not critical although it will be understood that the larger the particles the more time will be required to heat the mass to the desired temperature. In practice, use has been made of particles having a mesh size less than 20 and sometimes less than 100 mesh. When larger particles are employed, breakdown of the particles to a number of particles of small size will usually and desirably occur in response to the release of combined water.

Furnaces of various types and construction may be employed. For an illustration of the practice of this invention, reference will now be made to FIG. 1 of the drawing. The numeral 10 illustrates a furnace which in cross-section is of a conical shape having a top wall 12 which slopes downwardly to vertically disposed side walls 14 from an inlet opening 16 at the top. Radiant gas heaters 18 are provided in the areas between the walls of the furnace and baffle plates 20 provided in spaced relationship with the interior of the walls. The bottom wall of the furnace is in the form of a flexible metal belt 22 which operates about sprockets 24 and 26, one of which is driven by a motor 28 for movement of the top flight of the belt in one direction through an opening 30 in one end of the furnace.

A compacting roller 32 is mounted within the furnace in a predetermined spaced relation with the top of the belt and means are provided for varying the spaced relationship between the roller and belt so as to provide for a controlled amount of compacting of the layer 34 of expanded perlite particles which are collected on the surface of the belt in advance of the roller. It is preferred also to provide a backing roll 36 beneath the belt in the vicinity of the compacting roller to support the belt for compacting the material in between. Instead of a backing roll, use can be made of a stationary backing plate to support the belt beneath the compacting roller.

The furnace is heated to a temperature of about 2500° F. in an illustrative set of conditions. The perlite particles (−20 +100) are introduced into the furnace through the inlet 16 at the top. The particles are rained down gravitationally through the furnace and are collected on the top flight of the moving belt 22 to form a layer 34 thereon. The thickness of the layer can be adjusted by the rate of introduction of the perlite into the furnace or by the linear rate of travel of the belt. The dimension of the furnace and the rate of travel of the belt are calculated to expose the particles of perlite to the temperature conditions existing for a time ranging from about 5 seconds to about 50 seconds. During this time the particles will be heated to a temperature of about 2000–2200° F. At this temperature, the perlite particles become pyroplastic so that the combined water can be released to cause expansion in the order of about 800–1000 percent. At the same time, the particles are sufficiently sticky to cause adhesions one to another when collected on the belt. The amount of adhesion and the extent of the surfaces that are adhered will be increased upon passage of the layer 34 beneath the compacting roller 32.

When the particles are introduced directly into the flame of a direct heating furnace, the time of exposure can be less and the impacting of the particles onto the collecting surface will often provide sufficient force to cause agglomeration without the need for compacting rollers although rollers are desirable for maximum adhesion between the expanded particles collected to form the composite layer. By way of a further modification, use can be made of vacuum means beneath the belt to draw the expanded particles downwardly onto the collecting wall for compacting, with or without the compacting roller, and such means can be employed in direct or radiant furnaces. When use is made of such vacuum means, it is desirable to employ a metal belt replete with openings to enable a uniform vacuum to be drawn across the width and throughout the length of the belt.

The concepts of this invention include the addition of inorganic eutectic materials in dry powder form for admixture with the finely divided particles of perlite to provide eutectic material on the surfaces of the perlite particles. The eutectic materials are selected to be reduced to an adhesive state at a temperature within the pyroplastic range of the perlite particles and preferably below such temperatures so as to function as an inorganic adhesive which operates alone or in combination with the adhesiveness of the perlite particles firmly to bond the expanded particles together. For this purpose, use can be made of materials which have a lower fusion range than perlite and such materials may be represented by sodium silicate, borates, borax, magnesia, calcium hydroxide, and the like low melting point glasses or metal salts. Improvement in the bonding relation with resultant increase in strength properties of the composite mass is secured when such adhesive eutectic material is embodied with the perlite particles in an amount greater than 0.1 percent by weight of the perlite but less than 10 percent by weight of the perlite. It is preferred to make use of an amount within the range of 0.5 to 2.0 percent by weight of the perlite since such amounts will add materially to the adhesiveness without undesirably affecting the porosity or the specific gravity of the formed structure. The eutectic material in dry powder form can be admixed with the perlite particles in advance of heating to provide for a relatively uniform distribution of the eutectic adhesive particles over the surfaec of the perlite.

The strength properties of the composite mass of expanded perlite can be increased by the combination to include fibers of glass or of other inorganic or ceramic materials as a component in combination with the perlite particles which are subjected to the thermal expansion step. It is preferred to make use of glass fibers because of the high strength characteristics of such fibers and because of their relative inertness from the standpoint of chemical, weather and heat resistance. Other fibers can be employed but it is essential to limit the use to inorganic fibers which are capable of retaining their fibrous characteristics nad strengths at the temperature conditions to which the fibers are subjected for expansion of the perlite. Included also will be fibers formed of metal.

Most high strength glass or other siliceous fibers are capable of retaining their fibrous characteristics for the short period of time to which they are exposed and at the temperature conditions existing. When, however, the ordinary high sodium glasses cannot be employed as a reinforcement for the composite formed of the expanded perlite, use can be made of fibers or higher melting point glasses such as the high silica glasses or quartz glasses as represented by glasses of the following compositions which have a melting point above 2000° F.

EXAMPLE 1

| | Percent by wt. |
| --- | --- |
| Silica | 87.5 |
| Titanium dioxide | 11.5 |
| Calcium oxide | 1.0 |

EXAMPLE 2

| | Percent by wt. |
| --- | --- |
| Silica | 86.0 |
| Sodium oxide | 7.5 |
| Beryllium oxide | 6.5 |

EXAMPLE 3

| | Percent by wt. |
| --- | --- |
| Silica | 87.0 |
| Aluminum oxide ($Al_2O_3$) | 8.0 |
| Iron oxide ($Fe_2O_3$) | 2.0 |
| Magnesium oxide (MgO) | 1.0 |
| Potassium or sodium oxide | 2.0 |

For reinforcement, siliceous fibers in the amounts ranging from 0.5 to 10.0 percent by weight may be incorporated. When more than 5 percent by weight is introduced, difficulties will be encountered in feeding the material through the furnace. In addition to reinforcement markedly to increase the strength properties of the composite of expanded perlite, it has been found that the presence of glass and the like fibers in the amounts described will operate unexpectedly to impart a flexibility to the ordinary rigid and relatively brittle composite formed of perlite which is expanded and agglomerated in accordance with the practice of this invention.

The high strength properties of glass fibers exist chiefly in tension whereas the composite of expanded perlite which is formed in accordance with the practice of this invention has been found to have good compressive strengths and relatively poor tensile strengths. Thus the combination of glass fibers and expanded perlite operates to produce a product having good physical and mechanical properties without loss of other desirable characteristics of the insulation.

Similarly, colored metal oxides and salts in powder or other finely divided form can be introduced with the perlite particles to provide a color in the final product. For this purpose, use can be made of cobalt oxide, lead oxide, iron oxide, molybdenum oxide, copper oxide and the like colored metal oxide or colored salts of cobalt, copper molybdenum and the like. The metal oxides or salts can be varied in amounts depending upon the color intensity desired in the final product but it is undesirable to dilute the perlite by the use of the metal oxide or salt in amounts greater than 5 percent by weight of the perlite.

By way of still further modification, a panel having improved insulation characteristics can be prepared in accordance with the practice of this invention by the formation of the panel with contiguous layers of expanded perlite compacted to variable densities such as to produce a panel having a low density at one side with increasing densities from the one side to the other or with a low density material in the outer walls with a core of high density material in between or vice versa. For this purpose, use can be made of a series of compacting rollers with areas in between for the deposition of agglomerating particles of expanded perlite and in which the thickness of the layer deposited and the amount of compacting effected is controlled to give the layer the desired density characteristics. Instead, use can be made of perlite ores of different compositions introduced at separate longitudinally spaced inlets crosswise of the furnace to provide layers of the desired variation in density.

In the drawing, illustration is made of a construction wherein an outer layer 40 is formed of low density with an intermediate layer 42 of intermediate density and the layer 44 at the opposite side of highest density. Instead, the outer layers may correspond to the layers 40 of low density with the intermediate layer 42 being of the higher density characterized by the layers 42 or 44 of the illustration.

It will be apparent from the foregoing that I have provided for the construction and fabrication of a new and improved structural panel formed essentially and predominantly of an expanded perlite or the like inorganic materials capable of being expanded and adhered while in a pyroplastic state.

It will be further understood that changes may be made in the details of materials, construction and operation without departing from the spirit of the invention, especially as defined in the following claims.

I claim:

1. A composite, porous, thermal insulation panel characterized by dimensional stability and structural strength consisting essentially of expanded perlite particles which are interbonded one to another by interfusion between the surfaces of the perlite particles while in a pyropylastic state to form a porous perlite panel.

2. An insulation panel as claimed in claim 1 in which the panel is formed in cross-section with layers of different densities.

References Cited
UNITED STATES PATENTS

| | | | |
|---|---|---|---|
| 2,347,233 | 4/1944 | Abernathy | 161—162 X |
| 2,600,812 | 6/1952 | Thomas. | |
| 2,634,207 | 4/1953 | Miscall et al. | |
| 2,750,322 | 6/1956 | Cooke et al. | 161—166 X |
| 2,853,394 | 9/1958 | Riddell et al. | 161—162 X |
| 3,010,835 | 11/1961 | Charles et al. | |
| 2,517,235 | 8/1950 | Pierce. | |
| 2,691,248 | 10/1954 | Ford | 161—161 X |
| 2,550,877 | 5/1951 | Stafford et al. | 252—378 |

MORRIS SUSSMAN, Primary Examiner

U.S. Cl. X.R.

161—162, 166, 158; 252—378